US00RE48826E

(19) United States
(12) Reissued Patent
Lee et al.

(10) Patent Number: US RE48,826 E
(45) Date of Reissued Patent: Nov. 23, 2021

(54) COMPRESSOR

(71) Applicant: LG ELECTRONICS INC., Seoul (KR)

(72) Inventors: Kangwook Lee, Seoul (KR); Cheolhwan Kim, Seoul (KR); Byeongchul Lee, Seoul (KR)

(73) Assignee: LG ELECTRONICS INC., Seoul (KR)

(21) Appl. No.: 16/850,303

(22) Filed: Apr. 16, 2020

Related U.S. Patent Documents

Reissue of:
(64) Patent No.: 9,945,381
Issued: Apr. 17, 2018
Appl. No.: 14/587,901
Filed: Dec. 31, 2014

U.S. Applications:
(63) Continuation of application No. 16/850,234, filed on Apr. 16, 2020, now Pat. No. Re. 48,456, which is an application for the reissue of Pat. No. 9,945,381.

(30) Foreign Application Priority Data

Aug. 7, 2014 (KR) ..... 10-2014-0101815

(51) Int. Cl.
*F04C 29/02* (2006.01)
*F04C 18/02* (2006.01)
(Continued)

(52) U.S. Cl.
CPC ..... *F04C 29/026* (2013.01); *F04C 18/0215* (2013.01); *F04C 23/008* (2013.01);
(Continued)

(58) Field of Classification Search
CPC ..... F04C 29/026; F04C 18/0215; F04C 29/0085; F04C 29/028; F04C 23/008; F04C 2240/807; F04C 29/025
See application file for complete search history.

(56) References Cited

U.S. PATENT DOCUMENTS 5,037,278 A * 8/1991 Fujio ..... F04C 18/0215 418/181
5,213,490 A * 5/1993 Yamamoto ..... F04C 23/008 418/55.6
(Continued)

FOREIGN PATENT DOCUMENTS

CN 203500009 3/2014
EP 1956244 8/2008
(Continued)

OTHER PUBLICATIONS

Chinese Office Action dated Mar. 30, 2017 issued in Application No. 201510166475.2 (with English translation).
(Continued)

*Primary Examiner* — William C Doerrler
(74) *Attorney, Agent, or Firm* — Ked & Associates LLP

(57) ABSTRACT

A compressor is provided that may include a passage separator provided between an electric motor drive and a compression device to separate a refrigerant passage from an oil passage. The passage separator may include a first partition wall and a second partition wall. The first partition wall may be disposed between an inner circumferential surface of a casing and a discharge hole of the compression device, and the second partition wall may be disposed between the discharge hole and a balance weight. Accordingly, the refrigerant passage may be separated from the oil passage between the compression device and electric motor drive, thereby efficiently recovering oil to an oil storage space.

11 Claims, 12 Drawing Sheets

(51) Int. Cl.
*F04C 23/00* (2006.01)
*F04C 29/00* (2006.01)

(52) U.S. Cl.
CPC ..... *F04C 29/0085* (2013.01); *F04C 29/028* (2013.01); *F04C 29/025* (2013.01); *F04C 2240/807* (2013.01)

(56) References Cited

U.S. PATENT DOCUMENTS

| | | | | |
|---|---|---|---|---|
| 7,819,644 | B2 * | 10/2010 | Eber | F04C 18/0215 418/55.1 |
| 2004/0253133 | A1 * | 12/2004 | Gennami | F04C 18/0215 418/55.1 |
| 2008/0170955 | A1 | 7/2008 | Eber et al. | |
| 2008/0170957 | A1 * | 7/2008 | Hwang | F04C 23/008 418/97 |
| 2012/0294733 | A1 * | 11/2012 | Yamada | F04C 29/028 417/63 |
| 2012/0297818 | A1 | 11/2012 | Toyama | |
| 2013/0251563 | A1 * | 9/2013 | Duppert | F04C 18/0215 417/410.5 |
| 2014/0017108 | A1 * | 1/2014 | Uekawa | F04C 23/008 418/55.1 |
| 2015/0354572 | A1 * | 12/2015 | Yokoyama | F04C 18/0261 62/469 |
| 2016/0047380 | A1 | 2/2016 | Kim | |
| 2017/0306964 | A1 | 10/2017 | Kim | |
| 2018/0328364 | A1 | 11/2018 | Kim | |

FOREIGN PATENT DOCUMENTS

| | | | |
|---|---|---|---|
| EP | 1956244 | A2 | 8/2008 |
| JP | H07 279867 | | 10/1995 |
| JP | H07 279867 | A | 10/1995 |
| JP | 2009-264175 | | 11/2009 |
| JP | 2013 137004 | | 7/2013 |
| JP | 2013 137004 | A | 7/2013 |
| JP | 2013-231442 | | 11/2013 |
| KR | 1995-0004542 | | 5/1995 |
| WO | WO 2004/01001 | | 1/2004 |
| WO | WO 2004/010001 | A1 | 1/2004 |

OTHER PUBLICATIONS

U.S. Final Office Action dated Jul. 6, 2017 issued in U.S. Appl. No. 14/587,901.

U.S. Office Action dated Jan. 27, 2017 issued in U.S. Appl. No. 14/587,901.

U.S. Appl. No. 16/850,234, filed Apr. 16, 2020.

Korean Office Action dated Sep. 25, 2020 issued in Application No. 10-2014-0101815.

U.S. Notice of Allowance dated Oct. 29, 2020 issued in U.S. Appl. No. 16/850,234.

European Search Report dated Feb. 11, 2016 issued in Application No. 15169809.9.

Chinese Ofice Action dated Mar. 30, 2017 issued in Application No. 201510166475.2 (with English translation).

* cited by examiner

COMPRESSOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED [APPLICATION] *APPLICATIONS*

[The present] *This* application *is a Continuation Reissue of U.S. application Ser. No. 16/850,234, filed Apr. 16, 2020, which is a Reissue Application of U.S. Pat. No. 9,945,381 issued Apr. 17, 2018* (*U.S. patent application Ser. No. 14/587,901 filed Dec. 31, 2014*), *which* claims priority *under 35 U.S.C. § 119* to Korean Application No. 10-2014-0101815, filed in Korea on Aug. 7, 2014, [which is herein] *whose entire disclosures are hereby* expressly incorporated by reference in [its] *their* entirety. *More than one reissue application has been filed for the reissue of U.S. Pat. No. 9,945,381. The reissue application numbers are U.S. application Ser. Nos. 16/850,234, and 16/850,303* (*the present application*), *which is a Continuation Reissue of U.S. application Ser. No. 16/850,234.*

BACKGROUND

1. Field

A compressor is disclosed herein.

2. Background

In general, a compressor is applicable to a vapor compression type refrigeration cycle (hereinafter, referred to as a "refrigeration cycle"), such as a refrigerator, or air conditioner, for example. A compressor can typically be divided into a hermetic type compressor, in which an electric motor drive, that is, a typical electromotor, and a compression unit or device operated by the electric motor drive are provided together at an inner space of a sealed casing, and an open type compressor, in which an electric motor drive is provided outside of the casing. The hermetic compressor is generally used for household or commercial refrigeration devices.

Compressors can further be divided into a reciprocating type, a rotary type, or a scroll type, according to a type of compressing method of a refrigerant. The reciprocating type compressor is a type that compresses a refrigerant while a piston drive linearly moves a piston. The rotary type compressor is a type that compresses a refrigerant using a rolling piston to perform an eccentric rotational movement in a compression space of the cylinder and a vane in contact with the rolling piston to partition the compression space of the cylinder into a suction chamber and a discharge chamber.

The scroll type compressor is a compressor in which a fixed scroll is fixed to an inner space of a hermetic container, and two pairs of compression chambers including a suction chamber, an intermediate pressure chamber, and a discharge chamber are consecutively formed between a fixed wrap of the fixed scroll and an orbiting wrap of a orbiting wrap while the orbiting scroll engaged with the fixed scroll performs an orbiting movement. The scroll compressor is widely used in air conditioners to compress a refrigerant due to an advantage of obtaining a relatively high compression ratio compared to the other types of compressors, as well as obtaining a stable torque as suction, compression, and discharge strokes are smoothly carried out.

Such a compressor can be divided into an upper compression type and a lower compression type according to a location of the electric motor drive and compression device. The upper compression type is a type in which the compression device is located at an upper side above the electric motor drive, and the lower compression type is a type in which the compression device is located at a lower side lower than the electric motor drive. In particular, in a case of the lower compression type, refrigerant discharged into an internal space of the casing moves to a discharge pipe located at an upper portion thereof, while oil is recovered to an oil storage space, and thus, there is a concern that oil may be mixed with the refrigerant to be discharged out of the compressor, or pushed by a pressure of the refrigerant to be stagnant at an upper side of the electric motor drive during the process. According to the present disclosure, a technique in which a passage to recover oil and a passage to discharge refrigerant are divided within the casing to reduce oil spill will be described using a high-pressure, lower compression type scroll compressor (hereinafter, referred to as a lower compression type scroll compressor) as an example.

FIG. 1 is a cross-sectional view illustrating an example of a lower compression type scroll compressor according to the related art. As illustrated in FIG. 1, a lower compression type scroll compressor according to the related art may include an electric motor drive 2 provided in an internal space of a casing 1 and having a stator and a rotor, a compression unit or device 3 provided at a lower side of the electric motor drive 2, and a rotational shaft 5 that transmits a rotational force of the electric motor drive 2 to the compression device 3. A refrigerant discharge pipe 16 may be provided at an upper portion of the casing 1. A passage (Pm) to guide oil separated from refrigerant to be recovered to an oil storage space (V3) in the electric motor drive 2, while at a same time guiding refrigerant discharged from the compression device 3 to move in a direction of the refrigerant discharge pipe 16, is formed on an inner circumferential surface of the casing 1 and an outer circumferential surface of the electric motor drive 2 or an inner portion of the electric motor drive 2.

According to the foregoing lower compression type scroll compressor according to the related art, refrigerant and oil discharged from the compression device 3 may move to an upper side of the electric motor drive 2 through the passage (Pm) provided in the electric motor drive 2, and then, may be discharged outside of the compressor through the refrigerant discharge pipe 16. At this time, oil separated from refrigerant between the electric motor drive 2 and the compression device 3 moves to the oil storage space (V3) through a passage (Pc) provided in the compression device 3, while oil separated from refrigerant at an upper side of the electric motor drive 2 moves to the oil storage space (V3) at a lower side of the compressor device 3 through the passage (Pm) provided in the electric motor drive 2 and the passage (Pc) provided in the compression device 3.

However, according to the foregoing lower compression type scroll compressor according to the related art, as both refrigerant and oil move through the passage (Pm) provided in the electric motor drive 2, oil being moved from an upper side of the electric motor drive 2 to a lower side thereof is mixed with refrigerant discharged from the compression device 3 to be discharged out of the compressor along with the refrigerant, or is not allowed to pass through the passage (Pm) of the electric motor drive 2 due to high-pressure refrigerant stagnant at an upper space of the electric motor drive 2. Then, there is a problem in that an amount of oil supplied to the compression device 3 is reduced while an amount of oil recovered to the oil storage space (V3) is rapidly reduced, thereby causing friction loss or abrasion of the compression device 3.

In addition, there is also a problem in that oil supplied to the compression device 3 through an oil passage of the rotational shaft 5 to lubricate the compression device 3, and then, flowing into a space between the electric motor drive 2 and compression device 3 is mixed with refrigerant discharged from the compression device 3 to be discharged out of the compressor while being moved to an upper side of the electric motor drive 2 along with the refrigerant, thereby further aggravating oil shortage.

BRIEF DESCRIPTION OF THE DRAWINGS

Embodiments will be described in detail with reference to the following drawings in which like reference numerals refer to like elements, and wherein.

DETAILED DESCRIPTION

Figure 1:
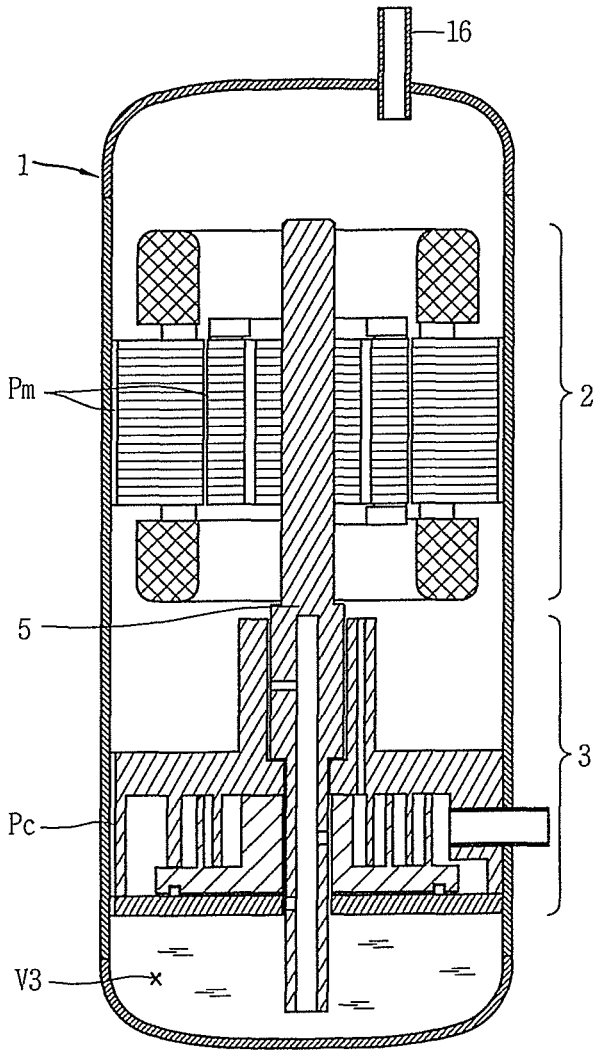
FIG. 1 RELATED ART
FIG. 1 is a cross-sectional view of a compressor according to the related art.

Hereinafter, a compressor according to embodiments will be described in detail with reference to the accompanying drawings. Where possible, like reference numerals have been used to indicate like elements, and repetitive disclosure has been omitted.

Figure 2:
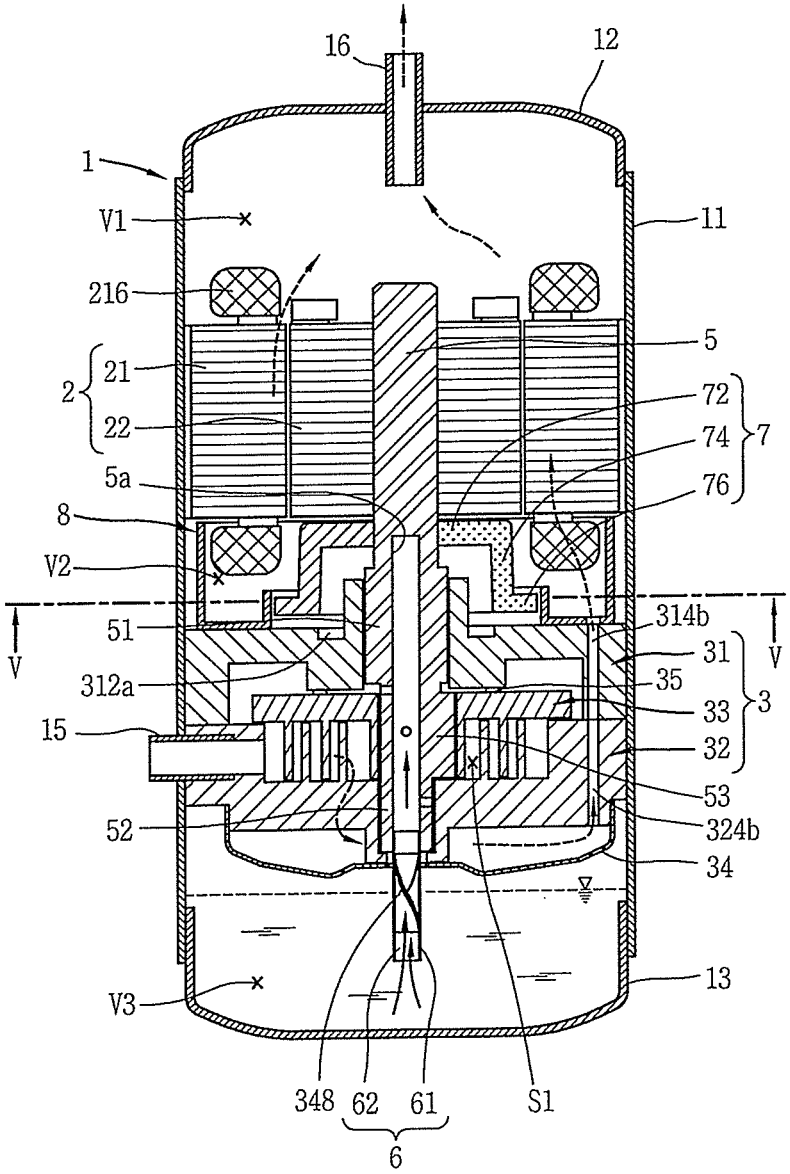
FIG. 2 is a cross-sectional view of a compressor according to an embodiment.
Figure 3:
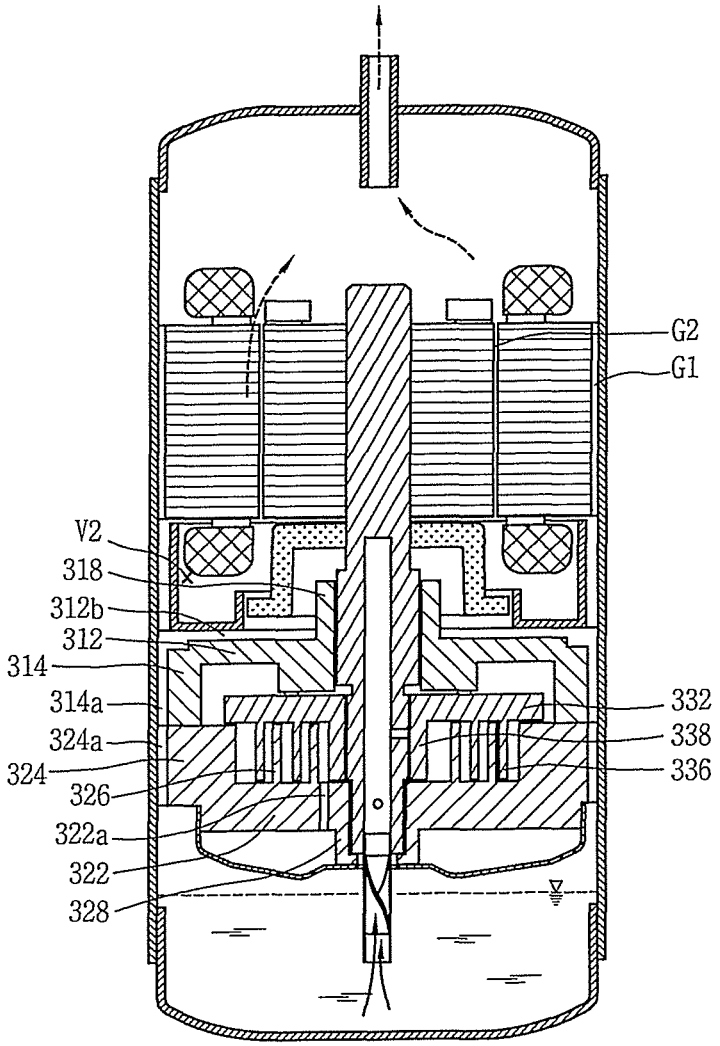
FIG. 3 is a cross-sectional view of the compressor of FIG. 2, viewed from another angle.
Figure 4:
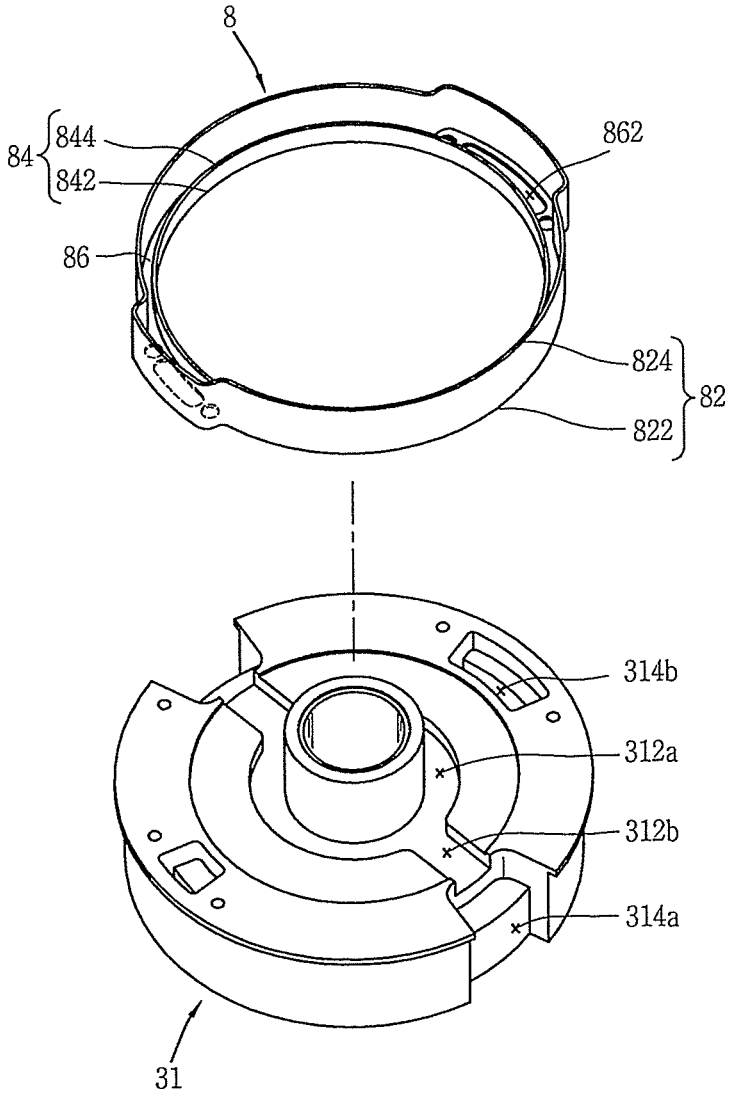
FIG. 4 is an exploded perspective view of a passage separator and a main frame of the compressor of FIG. 2.
Figure 5:
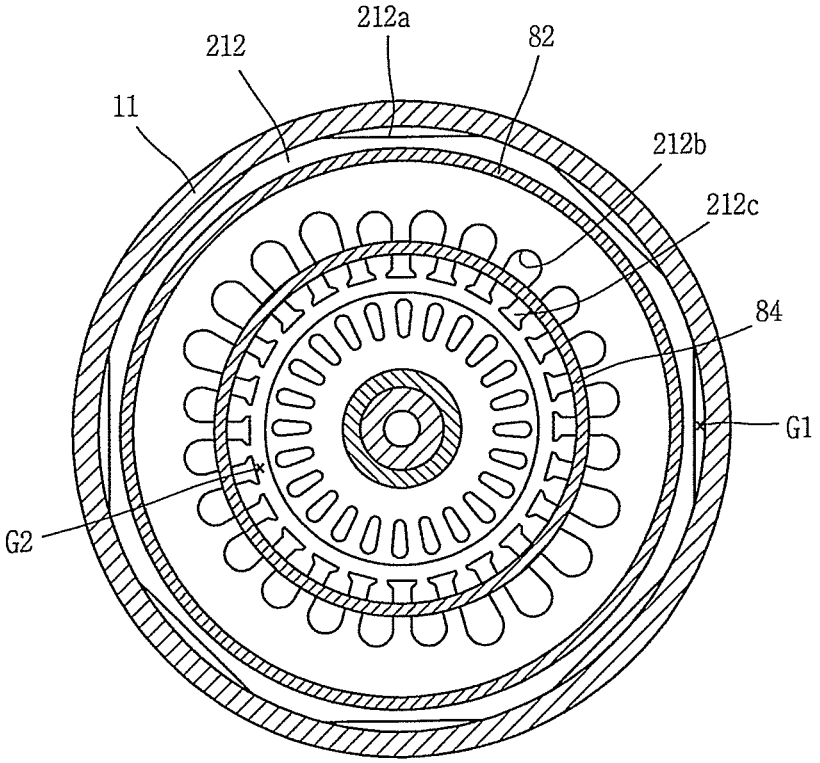
FIG. 5 is a cross-sectional view taken along line V-V in FIG. 2.

FIG. 2 is a cross-sectional view of a compressor according to an embodiment. FIG. 3 is a cross-sectional view of the compressor of FIG. 2, viewed from another angle. FIG. 4 is an exploded perspective view of a passage separator and a main frame of the compressor of FIG. 2. FIG. 5 is a cross-sectional view taken along line V-V in FIG. 2, in which a balance weight and a coil are not shown for the sake of convenience of explanation.

As illustrated in FIGS. 2 through 5, a compressor according to an embodiment may include a casing 1 having an internal space, an electric motor drive 2 provided at an upper portion of the internal space, a compression unit or device 3 provided at a lower portion of the electric motor drive 2, a rotational shaft 5 configured to transfer a drive force from the electric motor drive 2 to the compression device 3, and a passage separator 8 provided between the electric motor drive 2 and the compression device 3 to separate a refrigerant passage from an oil passage. The internal space of the casing 1 may be partitioned into a first space (V1) at an upper side of the electric motor drive 2, a second space (V2) between the electric motor drive 2 and the compression device 3, and a third space (V3) at a lower side of the compression device 3. Further, the passage separator 8 may be provided in the second space (V2).

The casing 1 may include a cylindrical shell 11, and an upper shell 12 and a lower shell 13 that cover an upper portion and a lower portion of the cylindrical shell 11, respectively. The upper shell 12 and lower shell 13 may be coupled to the cylindrical shell 11 by, for example, welding, to form the enclosed internal space along with the cylindrical shell 11.

A refrigerant discharge pipe 16 to guide refrigerant, discharged to an internal space of the casing 1, from the compression device 3 outside of the casing 1 to, for example, a condensing unit or condenser (not shown) of a vapor compression type cooling cycle device may be provided in the upper shell 12. In other words, the refrigerant discharge pipe 16 may be provided in the first space (V1). A refrigerant suction pipe 15 to guide refrigerant to be compressed from outside of the casing 1 to a compression chamber (S1) of the compression device 3, which will be described herein below, may be provided on or at a lateral surface of the cylindrical shell 11.

The lower shell 13 may function as an oil chamber to store oil supplied to efficiently operate the compressor. In other words, an oil storage space may be provided in the third space (V3).

The electric motor drive 2 to generate a rotational force may be provided at a substantially upper portion within the cylindrical shell 11. The electric motor drive 2 may include a stator 21 fixed to an inner surface of the cylindrical shell 11 and a rotor 22 located within the stator 21 to be rotated by an interaction with the stator 21.

The stator 21 may be formed in a substantially annular shape, and may include an iron core 212 laminated with multiple sheets, and a coil 216 wound around the iron core 212. An outer circumferential surface of the iron core 212 may be formed with a cut surface 212a angulated along a circumferential direction thereof, and thus, a space (G1) may be formed between the outer circumferential surface, more particularly, cut surface 212a, of the iron core 212 and the cylindrical shell 11. The space (G1) between the outer circumferential surface of the iron core 212 and the cylindrical shell 11 may also be formed in another manner. For example, the space (G1) may be provided by forming an outer circumferential surface of the iron core 212 in a circular shape while forming an engraved groove (not shown) on the outer circumferential surface. A plurality of slots 212b formed on an inner circumferential surface of the iron core 212 in an axial direction may be provided along a circumferential direction thereof. The coil 216 may be wound around a teeth portion 212c between the slots 212b. An insulator 214 to insulate the coil 216 from the iron core 212 may be provided between the coil 216 and iron core 212.

The rotor 22 may be formed in a substantially cylindrical shape, and an outer circumferential surface of the rotor 22 may be provided to face an inner circumferential surface of the stator 21 with a predetermined gap (G2) therebetween. Further, the rotational shaft 5 may be inserted into and coupled to a center of the rotor 22.

The space (G1) between the stator 21 and the cylindrical shell 11, and the gap (G2) between the stator 21 and the rotor 22 may form a first passage and a second passage, respectively, thereby allowing the first space (V1) to communicate with the second space (V2). Accordingly, oil may move from the first space (V1) to the second space (V2) through first passage (G1), and refrigerant may move from the second space (V2) to the first space (V1) through second passage 212b (G2).

A main frame 31 of the compression device 3 may be provided fixed to a lower side of the electric motor drive 2. The main frame 31 may include a frame end plate 312 (hereinafter, referred to as a "first end plate") having a substantially circular shape, a frame side wall 314 (hereinafter, referred to as a "first side wall") that protrudes from an outer circumferential portion of the first end plate 312 toward a lower side thereof, and a frame bearing 318 (hereinafter, referred to as a "first bearing") provided at a center of the first end plate 312 through which the rotational shaft 5 may pass.

An outer circumferential portion of the first side wall 314 may face or be brought into contact with an inner circumferential surface of the cylindrical shell 11, and a lower end portion thereof may be brought into contact with an upper end portion of a fixed scroll side wall 324, which will be described hereinbelow. Further, the first side wall 314 may be formed with a plurality of frame discharge grooves 314a (hereinafter, referred to as a "first groove") formed in an engraved manner along an axial direction on an outer circumferential surface thereof, and both axial sides of which may be open to form an oil path in a circumferential direction. An inlet of the first groove 314a may communicate with the second space (V2), and an outlet of which may communicate with an inlet of a fixed scroll groove 324a, which will be described hereinbelow, and a space may be formed between the first groove 314a and the cylindrical shell 11.

Further, the first side wall 314 may be provided with a frame discharge hole 314b (hereinafter, referred to as a "first discharge hole") that passes through an inner portion of the first side wall 314 to form a refrigerant path. An inlet of the first discharge hole 314b may communicate with an outlet of the fixed scroll discharge hole 324b, which will be described hereinbelow, and an outlet of which may communicate with the second space (V2).

The first bearing 318 may protrude from an upper surface of the first end plate 312 to a side of the electric motor drive 2. The first bearing 318 to support a main bearing 51 of the rotational shaft 5, which will be described hereinbelow, to pass therethrough.

An oil pocket 312a to collect oil discharged between the first bearing 318 and the rotational shaft 5 may be formed on an upper surface of the first end plate 312, and an oil recovery passage 312b forming a fifth passage to communicate the oil pocket 312a with the first groove 314a may be formed at one side of the oil pocket 312a. The oil pocket 312a may be formed as an engraved manner on an upper surface of the first end plate 312, and formed in an annular shape along an outer circumferential surface of the first bearing 318.

The oil recovery passage 312b may be formed as an engraved groove on an upper surface of the first end plate 312. In this case, the oil recovery passage 312b may communicate with a space between a first partition wall 82 and a second partition wall 84, which will be described hereinbelow, to be exposed to refrigerant, and thus, a cover may be provided between a space between the first partition wall 82 and the second partition wall 84 and the oil recovery passage 312b.

A fixed scroll 32 forming a first scroll may be coupled to a bottom surface of the main frame 31. The fixed scroll 32 may include a fixed scroll end plate 322 (hereinafter, referred to as "second end plate") having a substantially circular shape, the fixed scroll side wall 324 (hereinafter, referred to as a "second side wall") that protrudes toward an upper side from an outer circumferential portion of the second end plate 322, a fixed wrap 326 that protrudes from an upper surface of the second end plate 322 and combined with an orbiting wrap 336 of an orbiting scroll 33, which will be described hereinbelow, to form compression chamber (S1), and a fixed scroll bearing 328 (hereinafter, referred to as a "second bearing") formed at a center of a rear surface of the second end plate 322 through which the rotational shaft 5 may pass.

A discharge port 322a to guide compressed refrigerant from the compression chamber (S1) to an internal space of a discharge cover 34 may be formed on the second end plate 322. A location of the discharge port 322a may be arbitrarily set by taking a required discharge pressure into consideration.

The discharge cover 34, which may accommodate discharged refrigerant and guide it to the fixed scroll discharge hole 324b, which will be described hereinbelow, may be coupled to a bottom surface of the fixed scroll 32, as the discharge port 322a may be formed to extend toward the lower shell 13. The discharge cover 34 may be sealed and coupled to a bottom surface of the fixed scroll 32 to separate a discharge passage of refrigerant from the oil storage space (V3).

An internal space of the discharge cover 34 may be formed to accommodate the discharge port 322a, as well as accommodate an inlet of the fixed scroll groove 324a, which will be described hereinbelow. A through hole 348 may be formed in the discharge cover 34 to allow an oil feeder 6 coupled to a sub-bearing 52 of the rotational shaft 5, which will be described hereinbelow, to form a second bearing, and be submerged into the oil storage space (V3) of the casing 1, to pass therethrough.

An outer circumferential portion of the first partition 82 may be brought into contact with the inner circumferential surface of the cylindrical shell 11, and a lower end thereof may be brought into contact with an upper end of the first side wall 314.

Further, the fixed scroll groove 324a (hereinafter, referred to as a "second groove") formed in an engraved manner along an axial direction on an outer circumferential surface thereof, and both axial sides of which are open to form the oil path may be provided on the second side wall 324. The second groove 324a may be formed to correspond to the first groove 314a of the main frame 31, and an inlet of which may communicate with an outlet of the first groove 314a, and an outlet of which may communicate with the oil storage space of the third space (V3). The second groove 324a may form a space between the second partition wall 84 and the cylindrical shell 11.

The first groove 314a and the second groove 324a may provide communication between the second space (V2) and the third space (V3), to move oil from the second space (V2) to the third space (V3). Hereinafter, a passage formed by the first groove 314a and the second groove 324a may be referred to as a "third passage".

The fixed scroll discharge hole 324b (hereinafter, referred to as a "second discharge hole") may pass through an inner portion of the second side wall 324 in an axial direction to form a refrigerant path along with the first discharge hole 314b. The second discharge hole 324b may correspond to the first discharge hole 314b, and an inlet of which may communicate with an internal space of the discharge cover 34, and an outlet of which may communicate with an inlet of the first discharge hole 314b.

The second discharge hole 324b and the first discharge hole 314b may provide communication between an internal space of the discharge cover 34 and the second space (V2) to guide refrigerant discharged from the compression chamber (S1) to an internal space of the discharge cover 34 to the second space (V2). A passage formed by the second discharge hole 324b and the first discharge hole 314b may be referred to as a "fourth passage".

The refrigerant suction pipe 15 may be provided on the second side wall 324 and communicate with the suction side of the compression chamber (S1). The refrigerant suction pipe 15 maybe separated from the second discharge hole 324b.

The second bearing 328 may protrude from a lower surface of the second end plate 322 to or at a side of the oil storage space. The second bearing 328 may support a sub-bearing 52, which will be described hereinbelow, of the rotational shaft 5 and be inserted therein. Further, a lower end portion of the second bearing 328 may be bent toward a center of the rotational shaft 5 to support a lower end of the sub-bearing 52 so as to form a thrust bearing surface.

The orbiting scroll 33 may be coupled to the rotational shaft 5 to form two pairs of compression chambers (S1) between the fixed scroll 32 and the orbiting scroll 33 while performing an orbiting movement. The orbiting scroll 33 may be provided between the main frame 31 and the fixed scroll 32. The orbiting scroll 33 may include an orbiting scroll end plate 332 (hereinafter, referred to as a "third end plate") having a substantially circular shape, the orbiting wrap 336 which protrudes from a lower surface of the third end plate 332 to be teeth-combined with the fixed wrap 326, and a rotational shaft coupling portion 338 provided at a center of the third end plate 332 to be rotatably coupled to an eccentric portion 53, which will be described hereinbelow, of the rotational shaft 5.

The orbiting scroll 33 may be supported by the fixed scroll 32 in such a manner that an outer circumferential portion of the third end plate 332 is placed on an upper end portion of the second side wall 324, and a lower end portion of the orbiting wrap 336 is closed adhered to an upper surface of the second end plate 322. An outer circumferential portion of the rotational shaft coupling portion 338 may be coupled to the orbiting wrap 336 to perform a role of forming the compression chamber (S1) along with the fixed wrap 326 during a compression process. The fixed wrap 326 and orbiting wrap 336 may be formed in an involute shape, but may also be formed in other various shapes.

In addition, the eccentric portion 53, which will be described hereinbelow, of the rotational shaft 5 may be inserted into the rotational shaft coupling portion 338, such that the eccentric portion 53 may be coupled to the orbiting wrap 336 or fixed wrap 326 to be overlapped therewith in a radial direction of the compressor. As a result, a repulsive force of refrigerant may be applied to the fixed wrap 326 and the orbiting wrap 336, and a compressive force applied between the rotational shaft coupling portion 338 and the eccentric portion 53 as a reaction force with respect to this during the compression process. As described above, when the eccentric portion 53 of the rotational shaft 5 passes through the end plate portion 332 of the orbiting scroll 33 and is overlapped with the orbiting wrap 336 in the radial direction, the repulsive force and compressive force of refrigerant may be cancelled out by each other while being applied on a same plane based on the end plate 332. Because of this, tilting of the orbiting scroll 33 due to operation of the compressive force and the repulsive force may be prevented.

A lower portion of the rotational shaft 5 may be coupled to the compression device 3 to be supported in a radial direction while an upper portion thereof may be inserted into a center of the rotor 22 to be coupled thereto. As a result, the rotational shaft 5 may transfer a rotational force of the electric motor drive 2 to the orbiting scroll 33 of the compression device 3. Then, the orbiting scroll 33 eccentrically coupled to the rotational shaft 5 may perform an orbiting movement with respect to the fixed scroll 32.

The main bearing 51 may be formed at the lower portion of the rotational shaft 5 to be inserted into the first bearing 318 of the main frame 31 and supported in a radial direction, and the sub-bearing 52 may be formed at a lower side of the main bearing 51 to be inserted into the second bearing 328 of the fixed scroll 32 and supported in a radial direction. Further, the eccentric portion 53 may be formed between the main bearing 51 and sub-bearing 52 to be inserted into and coupled to the rotational shaft coupling portion 338 of the orbiting scroll 33. The main bearing 51 and the sub-bearing 52 may be formed on a coaxial line to have a same axial center, and the eccentric portion 53 may be eccentrically formed in a radial direction with respect to the main bearing 51 or the sub-bearing 52. The sub-bearing 52 may be eccentrically formed with respect to the main bearing 51.

It may be advantageous in allowing the rotational shaft 5 to pass through each of the bearings 318, 328, and rotational shaft coupling portion 338 to be coupled thereto, for an outer diameter of the eccentric portion 53 to be formed to be less than an outer diameter of the main bearing 51 and larger than an outer diameter of the sub-bearing 52. However, in a case in which the eccentric portion 53 is not integrated into the rotational shaft 5, but rather, is formed using an additional bearing, the rotational shaft 5 may be inserted thereinto and coupled thereto, even when the outer diameter of the sub-bearing 52 is not formed to be less than the outer diameter of the eccentric portion 53.

Moreover, an oil passage 5a to supply oil to bearings 51, 52 and eccentric portion 53 may be formed within the rotational shaft 5. The oil passage 5a may be formed by forming a groove that extends from a lower end of the rotational shaft 5 to a substantially lower end or intermediate height of the stator 21, or a height higher than a height of an upper end of the main bearing 51, as the compression device 3 is located at a lower side of the electric motor drive 2.

Further, an oil feeder 6 to pump oil filled in the oil storage space may be coupled to a lower end of the rotational shaft 5, namely, a lower end of the sub-bearing 52. The oil feeder 6 may include an oil supply pipe 61 inserted into and coupled to the oil passage 5a of the rotational shaft 5, and an oil suction member 62, such as a propeller, inserted into the oil supply pipe 61 to suck oil. The oil supply pipe 61 may be provided to pass through the through hole 348 of the discharge cover 34 to be submerged in the oil storage space.

A balance weight 7 to suppress noise vibration may be coupled to the rotor 22 or the rotational shaft 5. The balance weight 7 may be provided between the electric motor drive 2 and the compression device 3, namely, in the second space (V2). The balance weight 7 may include a coupling portion 72 coupled to a bottom surface of the rotor 22 or an outer circumferential surface of the rotational shaft 5, an extension portion 74 that extends from the coupling portion 72 at a lower side of the rotor 22, and a bent portion 76 bent from the extension portion 74 to protrude in a radial direction of the rotational shaft 5. According to this embodiment, an end portion of the bent portion 76 may be a portion which is farthest from a rotational center of the balance weight 7.

The passage separator 8 may include the first partition wall 82, which may be interposed between a refrigerant passage and an oil passage in the second space (V2), the second partition wall 84, which may be interposed between the rotational shaft 5 and the first partition wall 82, and a connector 86 that traverses or connects the first partition wall 82 and the second partition wall 84. The first partition wall 82 may be formed in a substantially annular shape, a first end 822 and a second end 824 may be located between an outlet of the first passage (G1) and an inlet of the second passage 212b (G2), and between an inlet of the third passage 314a, 324a and an outlet of the fourth passage 314b, 324b, respectively. Accordingly, the first partition wall 82 may allow the third passage 314a, 324a to communicate with the first passage (G1) formed between an inner circumferential surface of the cylindrical shell 11 and an outer circumferential surface of the compression device 3, and allow the fourth passage 314b, 324b to communicate with the second passage 212b (G2) formed between an outlet side of the compression device 3 and the second space (V2). Both ends 822, 824 of the first partition wall 82 may be closely adhered to the main frame 31 and stator 21, respectively, or alternatively, either one may be separated from its counterpart by an assembly tolerance to minimally reduce refrigerant leakage by taking damage during the assembly process into consideration.

The second partition wall 84 may be provided between the inlet of the second passage 212b (G2) and the rotational shaft 5, or between the outlet of the fourth passage 314b, 324b and the balance weight 7 to suppress refrigerant and oil from being mixed by the rotational shaft 5 and the balance weight 7 in the second space (V2). The second partition wall 84 may be formed in an annular shape with a smaller radius than a radius of the first partition wall 82. Further, the second partition wall 84 may be provided such that a first end 842 thereof is interposed between an outlet of the fourth passage 314b, 324b and the rotational shaft 5 or the balance weight 7, and a second end 844 is interposed between the gap (G2) between the stator 21 and the rotor 22 and a bottom surface of the slot 212b. In other words, the second partition wall 84 may be provided at an inner side (center side of the compressor) than the bottom surface of the slot 212b within a range of an axial projection space of the stator 21.

Further, the second partition wall 84 may be provided in such a manner that the first end 842 is closely adhered to the main frame 31, and the second end 844 is separated from the stator 21 similarly to the first partition wall 82. As a result, it may be possible to prevent the second partition wall 84 from being damaged between the stator 21 and the main frame 31 during assembly of the compressor, and increase an area of the second passage 212b (G2), thereby efficiently moving refrigerant from the second space (V2) to the first space (V1).

In other words, the second partition wall 84 may be provided to be separated from the stator 21 to allow refrigerant discharged from the fourth passage 314b, 324b to move through the gap (G2) between the stator 21 and the rotor 22 as well as the slot 212b. Of course, the slot 212b may communicate with the gap (G2) between the stator 21 and the rotor 22 to allow a portion of refrigerant that flows into the slot 212b to flow out to a side of the gap (G2) between the stator 21 and the rotor 22 and move into the first space (V1) through the gap (G2) even when the second partition wall 84 is closely adhered to the stator 21. However, the second partition wall 84 may be separated from the stator 21 to have a path (hereinafter, referred to as a "direct path") to allow refrigerant between the second partition wall 84 and the first partition wall 82 to directly flow into a gap between the stator 21 and the rotor 22 in order to more efficiently move refrigerant.

A separation distance (axial distance) between the second partition wall 84 and the stator 21 may be formed to be the same as a separation distance (axial distance) between a portion (bent portion) which is farthest from the rotational center of the balance weight 7 and the stator 21. This is to secure a direct path while effectively suppressing agitation due to the balance weight 7 because a portion which is the farthest from the rotational center of the balance weight 7 has a larger rotational radius than that of the other portions thereof, and thus, the resultant agitation effect is large.

Figure 6:
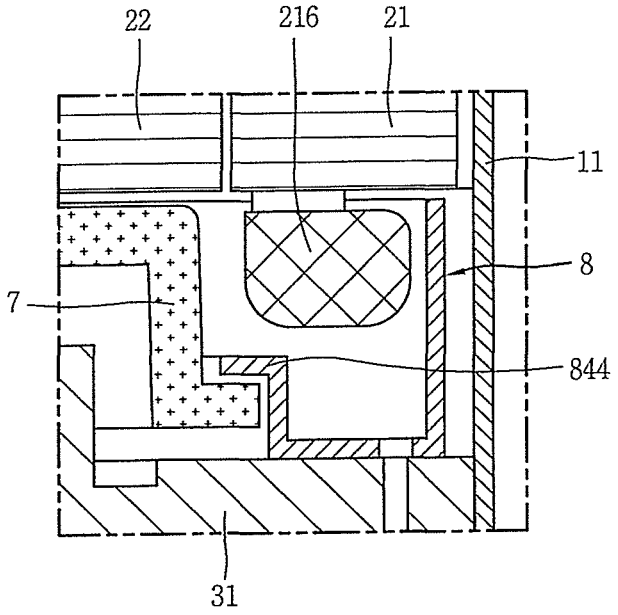
FIGS. 6 through 8 are partial cross-sectional views illustrating a passage separator in a compressor according to other embodiments.

As illustrated in FIG. 6, the second end 844 of the second partition wall 84 may extend in a bent manner to cover an upper side of the balance weight 7 to further suppress agitation due to the balance weight 7, while maintaining the secured area of the direct path. A case in which the separation distance (axial distance) between the second partition wall 84 and the stator 21 is smaller than the separation distance (axial distance) between the portion (bent portion) which is the farthest from the rotational center of the balance weight 7 and the stator 21, it may be advantageous with respect to suppressing agitation, but disadvantageous with respect to securing the direct path. In contrast, in a case in which the separation distance (axial distance) between the second partition wall 84 and the stator 21 is larger than the separation distance (axial distance) between the portion (bent portion) which is farthest from the rotational center of the balance weight 7 and the stator 21, vice versa.

The connector portion 86 may extend between the first partition wall 82 and the second partition wall 84, thereby modularizing the first partition wall 82 and the second partition wall 84 into an integral body. Due to this, it may be possible to facilitate fabrication of the compressor, and reduce fabrication costs.

In case of this embodiment, the connector 86 may prevent refrigerant discharged from the fourth passage 314b, 324b from leaking between the connector 86 and the main frame 31, and prevent a space between the first partition wall 82 and the second partition wall 84 from communicating with the oil recovery passage 312b (to operate as a cover portion of the oil recovery passage). In other words, the connector 86 may be formed in an annular and traverse the entire end 822 of the first partition wall 82 and the entire end 842 of the second partition wall 84, and an entire lower surface of the connector 86 may be provided to be closely adhered to the main frame 31.

A through hole 862 may be formed on a portion corresponding to an outlet of the fourth passage 314b, 324b, that is, an outlet of the first discharge hole 314b.

In the drawing, reference numeral 35 is an oldham ring to prevent the rotation of the orbiting scroll 33.

Hereinafter, operation of a compressor according to this embodiment will be described hereinbelow.

When power is applied to the electric motor drive 2 to generate a rotational force on the stator 21 and the rotational shaft 5, the orbiting scroll 33 eccentrically coupled to the rotational shaft 5 may perform an orbiting movement. Then, refrigerant supplied through the refrigerant suction pipe 15 from outside of the casing 1 may directly flow into the compression chamber (S1), and the refrigerant may be compressed by orbiting movement of the orbiting scroll 33, and then, discharged into an internal space of the discharge cover 34 through the discharge port 322a from the compression chamber (S1). The refrigerant discharged into the internal space of the discharge cover 34 may reduce noise while being circulated in the internal space of the discharge cover 34, and then move into the second space (V2) through the fourth passage 314b, 324b.

Then, a series of processes may be repeated, including guiding the refrigerant moved into the second space (V2) to the second passage 212b (G2) formed at the slot 212b of the stator 21 and the gap (G2) between the stator 21 and rotor 22 by the passage separator 8 and moved into the first space (V1), and then discharging the refrigerant outside of the compressor through the refrigerant discharge pipe 16, and separating oil from the refrigerant moved into the first space (V1) and recovered to an oil storage space through the first passage (G1) and third passage 314a, 324a. More specifically, refrigerant discharged into the second space (V2) from the fourth passage 314b, 324b may be blocked by the first partition wall 82 in a direction of the first passage (G1) and guided into the second passage 212b (G2). Accordingly, high-pressure refrigerant does not flow into the first passage (G1) so as not to generate a passage resistance in the first passage (G1), and thus, oil in the first space (V1) may be move to a side of a second space (V2) through the first passage (G1), and then, be recovered to an oil storage space through the third passage 314a, 324a.

Then, as the second partition wall 84 is formed between the outlet of the fourth passage 314b, 324b and the rotational shaft 5 or between the fourth passage 314b, 324b and the balance weight 7 in the second space (V2), refrigerant discharged into the second space (V2) may swiftly move into the first space (V1) through the slot 212b or the gap (G2) between the stator 21 and rotor 22 due to the second partition wall 84. On the other hand, refrigerant in the second space (V2) may be closely adhered to the main frame 31 to suppress the refrigerant from flowing into the first passage (G1), the third passage 314a, 324a, and oil recovery passage 312b by the connecting portion 86 covering the oil recovery passage 312b. Accordingly, most of the refrigerant in the second space (V2) may flow into the second passage 212b (G2) without flowing into the first passage (G1) or the third passage 314a, 324a or the oil recovery passage 312b.

On the other hand, refrigerant having flowed into the second passage 212b (G2) may move into the first space (V1), and oil may be separated from the refrigerant in the first space (V1). The oil may sequentially pass through the first passage (G1) and the third passage 314a, 324a to be recovered to the oil storage space of the third space (V3). At this time, as high-pressure refrigerant discharged from the compression device 3 may be prevented from flowing into the first passage (G1) or the third passage 314a, 324a by the first partition wall 82 of the passage separator 8, oil is not subject to resistance due to refrigerant, and thus, flows into the first passage (G1) to be efficiently recovered to the oil storage space.

On the other hand, oil supplied to sliding portions may perform a lubrication function and discharged to the side of the second space (V2) between the first bearing 318 and the rotational shaft 5. The oil may be collected in the oil pocket 312a, and then, may be recovered to the oil storage space of the third space (V3) through the oil recovery passage 312b and the third passage 314a, 324a. At this time, high-pressure refrigerant discharged from the fourth passage 314b, 324b may be prevented from flowing into the oil recovery passage 312b by the passage separator 8. Accordingly, oil in the oil recovery passage 312b is not subject to resistance due to refrigerant, and thus, may be efficiently recovered to the third passage 314a, 324a. Further, oil in the oil recovery passage 3126 may be blocked from being brought into contact with refrigerant discharged from the compression device 3 to prevent refrigerant and oil in the second space (V2) from being agitated by the rotational shaft 5 or the balance weight 7, thereby preventing oil in the second space (V2) from being mixed with refrigerant flowing in the second space (V2).

In this manner, in a compressor according to this embodiment, the passage separator 8 may be provided between the electric motor drive 2 and the compression device 3, thereby separating a refrigerant passage from an oil passage. As a result, it may be possible to efficiently recover oil to the oil storage space as well as efficiently supply oil to the sliding portions.

The passage separator 8 may be provided as an additional member to be fastened to the main frame 31, as discussed with respect to the previous embodiment; however, alternatively, according to circumstances, the passage separator 8 may also be formed on the main frame 31 as an integral body. Further, the passage separator 8 may extend in an upward direction with respect to the stator 21 from the main frame 31 as discussed with respect to the previous embodiment; however, alternatively, according to circumstances, the passage separator 8 may extend in a downward direction with respect to the stator 21 from the main frame 31. In this case, though not shown in the drawings, the passage separator 8 may extend from the insulator 214 formed of a material, such as plastic. When the passage separator 8 is formed on the insulator 214 as described above, only the first partition wall 82 may be formed thereon due to a structural characteristic in which a coil is wound around the insulator 214. As a result, the second partition wall 84 may be provided on the main frame 31 as needed.

Figure 7:
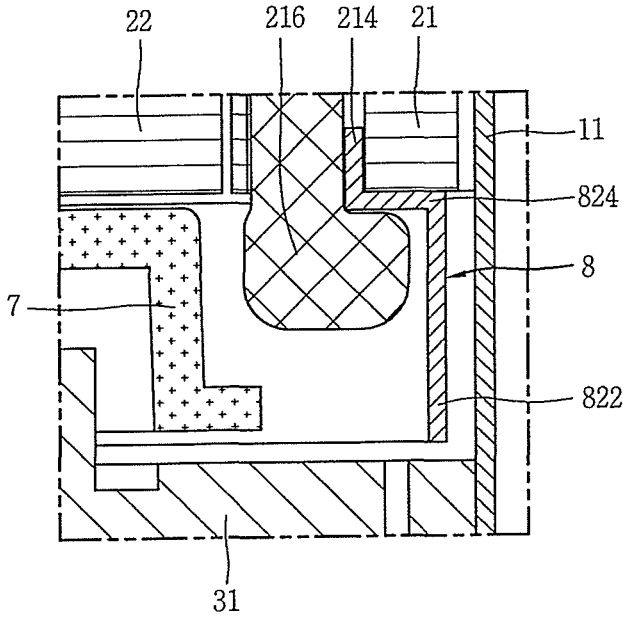
Figure 8:
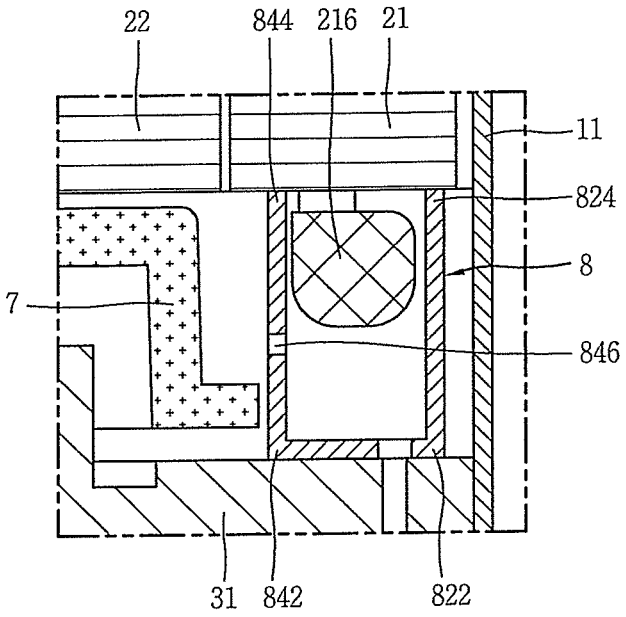

Further, in the case of the previous embodiment, the passage separator 8 is configured with the first partition wall 82, the second partition wall 84, and the connector 86; however, alternatively, according to circumstances, the passage separator 8 may be configured with only the first partition wall 82 or only the first partition wall 82. Further, in the case of the previous embodiment, as the passage separator 8 is provided on the main frame 31, the first end 822, 842 of the first partition wall 82 and second partition wall 84 is closely adhered to the main frame 31, and the second end 824, 844 is separated from the stator 21, but according to this embodiment, as illustrated in FIG. 7, the passage separator 8 may be provided on the stator 21 in such a manner that first end 822 of the first partition wall 82 is separated from the main frame 31 and the second end 824 thereof is closely adhered to the stator 21. Otherwise, as illustrated in FIG. 8, both ends 822, 824, 842, 844 of the first partition wall 82 and second partition wall 84, respectively, may all be closely adhered to the main frame 31 and stator 21 with the passage separator 8 provided on the main frame 31 (or stator 21). In this case, it may be advantageous for sealing. In this case, a hole or groove-shaped opening 846 to communicate spaces partitioned by the second partition wall 84 with each other may be provided thereon. In this case, the opening 846 of the second partition wall 84 may be formed at a position where it does not overlap with the portion which is the farthest from the rotational center of the balance weight 7 to suppress an agitation effect due to the balance weight 7 to a maximum. In other words, the opening 846 may be provided at an upper side or a lower side of the bent portion 76 of the balance weight 7. Of course, the opening 846 may not be provided thereon. In this case, a portion of refrigerant having flowed into the slot 212b may move to the first space (V1) through the gap (G2) of the stator 21 and rotor 22. However, the opening 846 may be provided thereon to secure the direct path.

Furthermore, in the case of the previous embodiment, the second partition wall 84 may be provided at an outside of the gap (G2) between the stator 21 and the rotor 22 by taking the balance weight 7 into consideration, but when the balance weight 7 is removed or provided on the stator 21 as illustrated in this embodiment, the second wall portion 84 may be provided at an inside of the gap (G2) between the stator 21 and the rotor 22 in a radial direction. In this case, the second passage 212b (G2) may not be blocked by the second partition wall 84, and thus, refrigerant may swiftly move to the first space (V1).

Figure 9:
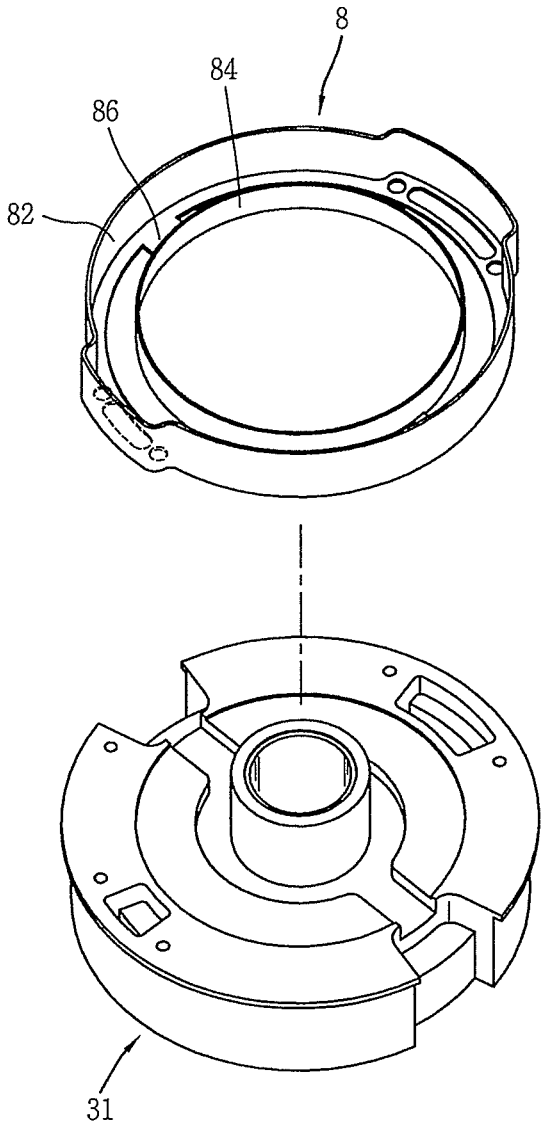
FIGS. 9 and 10 are exploded perspective views of a passage separator and a main frame in a compressor according to still another embodiment.

Also, in the case of the previous embodiment, the connector 86 may be formed in an annular shape, and the entire lower surface of the connector 86 may be closely adhered to the main frame 31, but as illustrated in this embodiment, the connector 86 may be closely adhered to only a portion forming an outlet of the fourth passage 314b, 324b of the main frame 31, and other portions of the connector 86 may be separated from other portions of the main frame 31. Accordingly, an area for precision machining may be decreased, thereby reducing fabrication costs. As another example, as illustrated in FIG. 9, the connector 86 may be formed in a pier shape traversing or connecting a portion of the first partition wall 82 and a portion of the second partition wall 84, and formed in such a manner that the connector 86 in the pier shape covers the oil recovery passage 312b.

Figure 10:
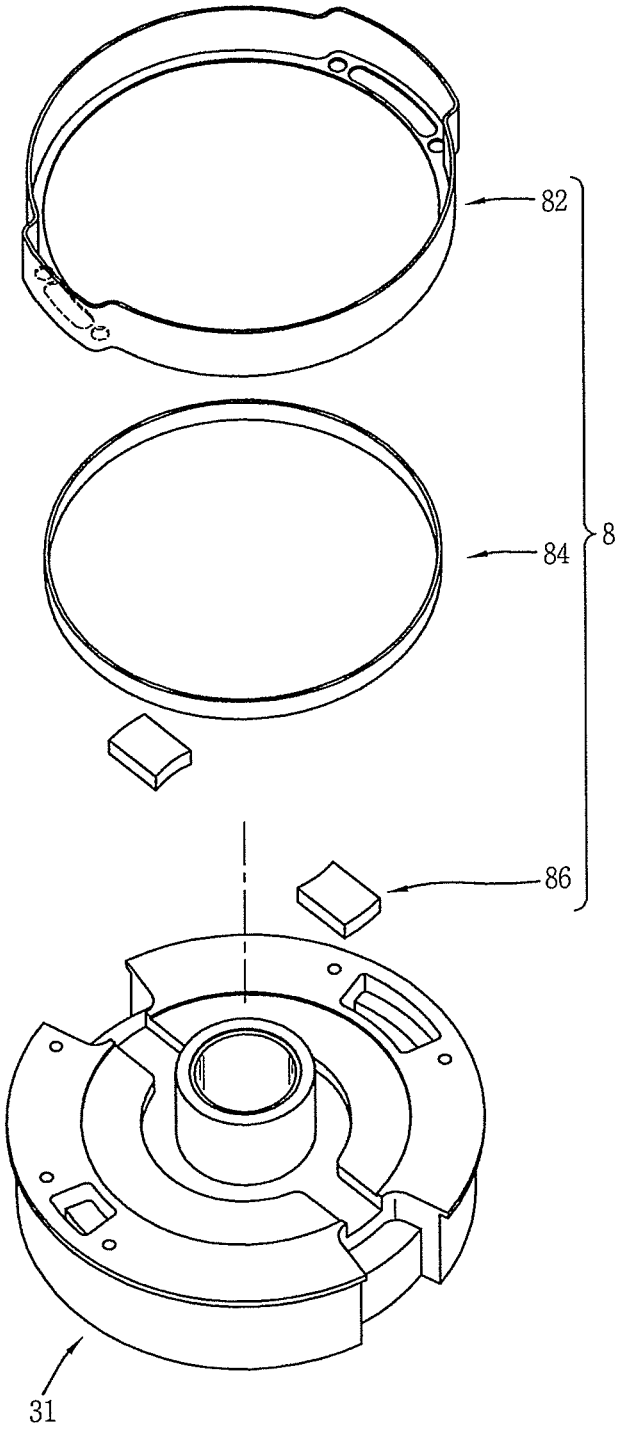

According to this embodiment, the connector 86 may be integrated into the first partition wall 82 and second partition wall 84 while forming a third partition wall; however, according to this embodiment, the connector 86 may be independently formed to be separated from the first partition wall 82 or second partition wall 84 as illustrated in FIG. 10.

Figure 11:
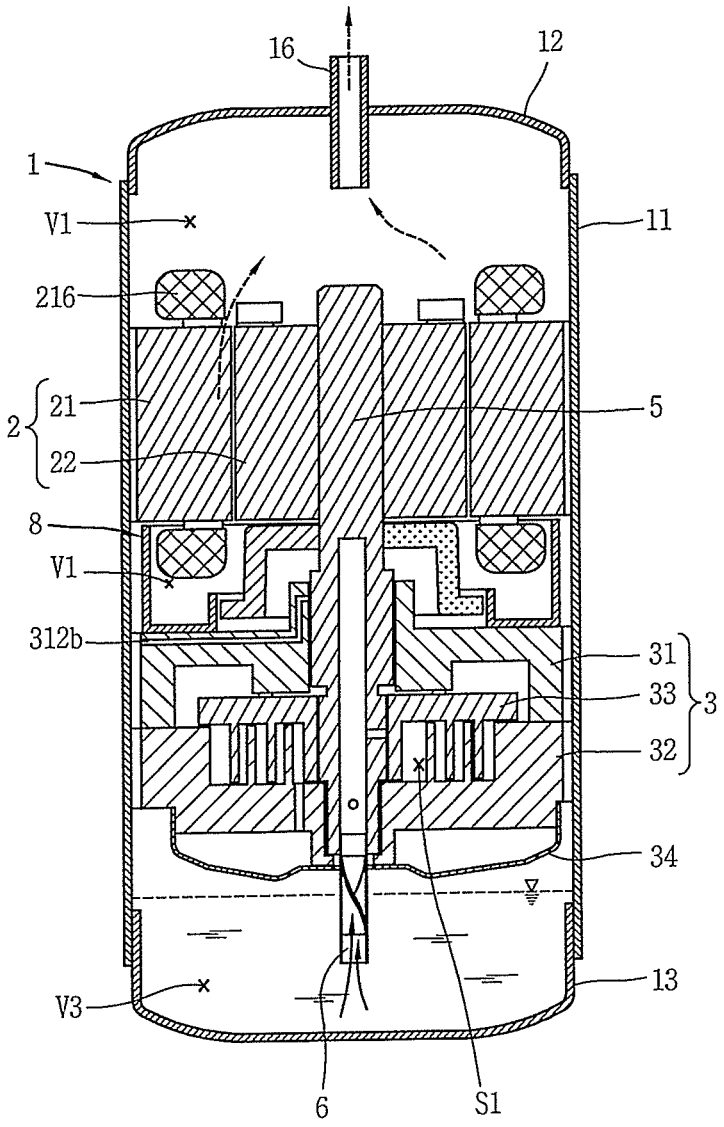
FIG. 11 is a cross-sectional view illustrating an oil recovery passage according to another embodiment.

According to the previous embodiment, the oil recovery passage 312b may be formed as an engraved groove on an upper surface of the first end plate 312 to be covered by the connector 86. However, in this case, the connector 86 forming a third partition wall may be required on the passage separator 8, thereby causing difficulties in fabrication or assembly of the passage separator 8. Accordingly, according to this embodiment, as illustrated in FIG. 11, the oil recovery passage 312b may be formed as a hole passing through an inner portion of the first end plate 312 of the main frame 31. In this case, an additional connector 86 may not be required on the passage separator 8, thereby simplifying a fabrication or assembly process of the passage separator 8.

Still another embodiment of a passage separator according to embodiments will be described below.

Figure 12:
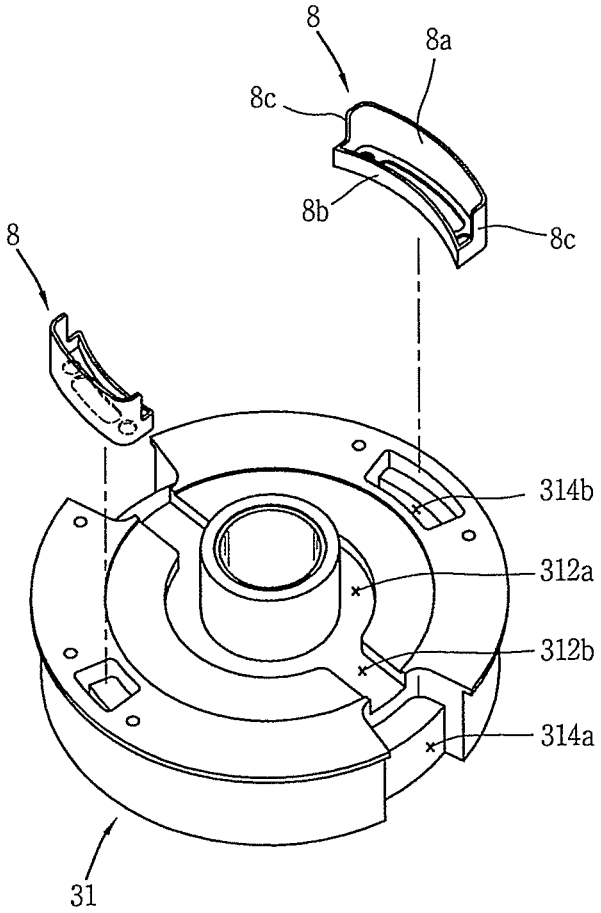
FIG. 12 is an exploded perspective view illustrating a passage separator according to another embodiment.

According to the previous embodiment, a first partition wall and a second partition wall forming the passage separator 8 may be formed in an annular shape and provided at an outside and inside of a discharge hole, but according to this embodiment, the passage separator 8 may be formed in a tube shape, and thus, provided to accommodate each discharge hole 314b, as illustrated in FIG. 12. In this case, the passage separator 8 may be formed in a square tube cross-sectional shape, as illustrated in FIG. 12; however, alternatively, according to circumstances, the passage separator may be formed in various shapes, such as a circular cross-sectional shape, or an arcuate cross-sectional shape.

Further, one end of the passage separator 8, namely, an end adjacent the electric motor drive 2 may be formed at a same height, or may have a height difference, such that refrigerant discharged through the first discharge hole 314b may be effectively prevented from flowing into the first passage, as well as efficiently guided to the second passage along an axial direction. To this end, an outer lateral surface 8a (hereinafter, referred to as a "first surface") in contact with the first passage may be formed at a height to contact with a bottom surface of the electric motor drive 2, and an inner lateral surface 8b (hereinafter, referred to as a "second surface") in contact with the second passage may be lower than that of the first surface 8a to have a predetermined distance from the bottom surface of the electric motor drive 2. Both side wall surfaces (third surfaces) 8c may be formed at a same height as that of the first surface 8a, or formed at a same height as that of the second surface 8b, or both sides may be formed at a same height as those of the first surface 8a and second surface 8b, but in a stepped or inclined manner at a middle thereof.

Figure 13:
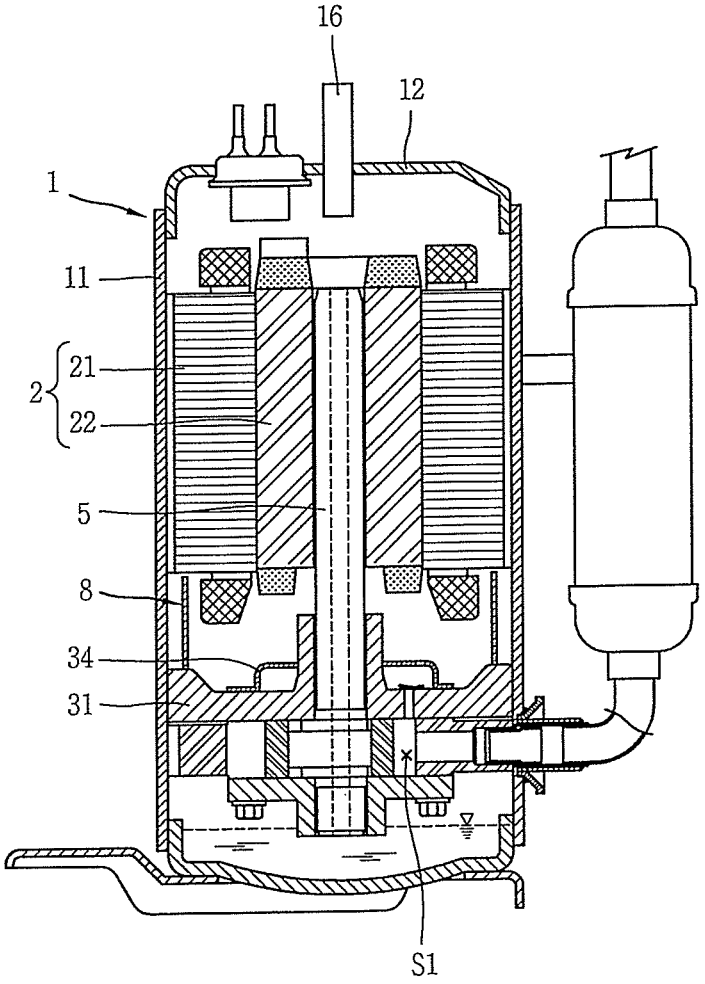
FIG. 13 is a cross-sectional view illustrating a compressor according to still another embodiment.

On the other hand, according to embodiments, a scroll compressor among lower compression type compressors has been described as a representative example; however, embodiments may be applicable to other type compressors according to circumstances. FIG. 13 is a cross-sectional view illustrating a rotary compressor.

In this case, a fundamental configuration and operation effect of passage separator 8 may be substantially the same as those of the previous embodiment. In other words, in this embodiment, the passage separator 8 may be provided between the electric motor drive 2 and the compression device 3 to separate a refrigerant passage from an oil passage. However, in this case, discharge cover 34 is provided on main frame 31, and thus, second partition wall 84 is not formed thereon, but rather, the second partition wall 84 is provided separate from the discharge cover a shape of the discharge cover 34 and a shape of the main frame 31 are changed.

Embodiments disclosed herein provide a compressor in which a refrigerant passage is separated from an oil passage within the casing, thereby efficiently recovering oil to an oil storage space.

Embodiments disclosed herein further provide a compressor in which oil that has lubricated a compressor device and flowed out into a space between the compressor device and an electric motor drive may be prevented from being mixed with refrigerant discharged from the compressor device, thereby efficiently recovering oil.

Embodiments disclosed herein provide a compressor that may include a casing having an internal space; an electric motor drive having a stator fixed to the internal space and a rotor rotatably provided within the stator; a compression unit or device provided at one side of the electric motor drive to have a discharge hole so as to discharge compressed refrigerant into the internal space of the casing; a rotating shaft configured to transfer a drive force from the electric motor drive to the compression unit; a balance weight provided on the rotor or the rotating shaft; and a passage separation portion or separator provided between the electric motor drive and the compression unit to separate a refrigerant passage from an oil passage. The passage separation portion may have a first partition wall portion or first partition wall, and a second partition wall portion or second partition wall. The first partition wall portion may be disposed between an inner circumferential surface of the casing and the discharge hole of the compression unit, and the second partition wall portion may be disposed between the discharge hole and the balance weight.

A slot, around which a coil may be wound, may be formed on the stator, and the first partition wall portion may be disposed at an outside of the slot. Further, both axial sides of the first partition wall portion may be closely adhered to the compression unit and electric motor drive, respectively. Furthermore, the second partition wall portion may have a path formed at either one of both sides to face the electric motor drive or compression unit.

The first partition wall portion or second partition wall portion may be formed to extend from the compression unit. Further, a slot, around which a coil may be wound, may be formed on the stator, and an insulator may be inserted into the slot, and the first partition wall portion may be formed to extend from the insulator. Furthermore, the second partition wall portion may be bent to cover an axial direction of the balance weight.

The compression unit may further include an oil recovery passage that communicates with an oil passage at one side of the compression unit. Further, the first partition wall portion and second partition wall portion may be connected to a third partition wall portion or third partition wall, and at least a part or portion of the oil recovery passage may be covered by the third partition wall portion. Furthermore, the first partition wall portion, second partition wall portion, and third partition wall portion may be formed as an integral body and fixed to the compression unit.

The oil recovery passage may be covered by a member separated from the passage separation portion. Further, the oil recovery passage may be formed with a hole that passes through the compression unit. Furthermore, at least one of the first partition wall portion or the second partition wall portion may be formed in an annular shape. Also, the first partition wall portion and the second partition wall portion may be formed as an integral body and fixed to the compression unit.

Embodiments disclosed herein further provide a compressor that may include a casing having an internal space; an electric motor drive having a stator fixed to the internal space, a cut surface of which is formed on an outer circumferential surface thereof to be separated from an inner circumferential surface of the casing and a rotor rotatably provided within the stator; a compression unit or device provided at one side of the electric motor drive and having a discharge hole so as to discharge compressed refrigerant into an internal space of the casing; a rotating shaft configured to transfer a drive force from the electric motor drive to the compression unit; and a passage separation portion or separator provided between the electric motor drive and the compression unit to separate a refrigerant passage from an oil passage. The passage separation portion may have a first partition wall portion or first partition wall, and a second partition wall portion or second partition wall. The first partition wall portion may be disposed between the discharge hole and the cut surface of the stator, and the second partition wall portion may be disposed between the discharge hole and a gap between the stator and rotor.

A balance weight may be formed on the rotor or rotating shaft, and the second partition wall portion may be provided between the discharge hole and the balance weight.

Embodiments disclosed herein further provide a compressor that may include a casing having an internal space; an electric motor drive having a stator fixed to the internal space, a cut surface of which is formed on an outer circumferential surface thereof to be separated from an inner circumferential surface of the casing and a rotor rotatably provided within the stator; a compression unit or device provided at one side of the electric motor drive to have a discharge hole so as to discharge compressed refrigerant into an internal space of the casing; a rotating shaft configured to transfer a drive force from the electric motor drive to the compression unit; and a passage separation portion or separator provided between the electric motor drive and the compression unit to separate a refrigerant passage from an oil passage. The passage separation portion is formed to surround at least a part or portion of the discharge hole, and guide compressed refrigerant coming out of the discharge hole in an axial direction.

The passage separation portion may be formed in a tube shape to accommodate the discharge hole, and an end portion of the electric motor drive side may be formed to have a height difference. Further, an end portion of the electric motor drive side of the passage separation portion may be formed such that a first surface located at an outer side of the discharge hole is formed to be higher than a second surface located at an inner side thereof based on the rotating shaft. Furthermore, the passage separation portion may be formed in an arcuate cross-sectional shape.

In a compressor according to embodiments, refrigerant discharged from the compressor may move to a refrigerant discharge pipe through a refrigerant passage, while oil separated from an upper side of the electric motor drive may move to an oil storage space through an oil passage, and thus, a passage to discharge the refrigerant may be separated from a passage to recover the oil to prevent the oil from being blocked by the refrigerant, and through this, oil may be efficiently recovered to the oil storage space of the casing, thereby preventing oil shortage in the compressor. In addition, oil that has lubricated the compressor and flowed out therefrom may be prevented from being mixed with refrigerant discharged from the compressor, as well as recovered to an oil storage space through an additional recovery passage to prevent the oil from being discharged out of the compressor along with the refrigerant, thereby more effectively reducing oil shortage in the compressor.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

[1. A compressor, comprising:

a casing having an internal space;

a drive comprising a stator fixed to the internal space, a cut surface being provided on an outer circumferential surface of the stator to be separated from an inner circumferential surface of the casing, and a rotor rotatably provided within the stator;

a compression device provided at one side of the drive and having a discharge hole so as to discharge compressed refrigerant into an internal space of the casing; a rotational shaft configured to transfer a drive force from the drive to the compression device; and a passage separator provided between the drive and the compression device to separate a refrigerant passage from an oil passage, wherein the passage separator surrounds at least a portion of the discharge hole and guides compressed refrigerant coming out of the discharge hole in an axial direction of the rotational shaft.]

[2. The compressor of claim 1, wherein the passage separator is formed in a tube shape to accommodate the discharge hole, and wherein an end of the passage separator on a side adjacent the drive is formed to have a height difference.]

[3. The compressor of claim 2, wherein the end of the passage separator is formed such that a first surface located at an outer side of the discharge hole with respect to the rotational shaft is formed to be higher than a second surface located at an inner side thereof.]

[4. The compressor of claim 1, wherein the passage separator is formed in an arcuate cross-sectional shape.]

[5. A compressor, comprising:

a casing having an internal space;

a drive comprising a stator fixed in the internal space and a rotor rotatably provided within the stator;

a compression device provided at one side of the drive and having a discharge hole so as to discharge compressed refrigerant into the internal space of the casing;

a rotational shaft configured to transfer a drive force from the drive to the compression device;

a balance weight provided on the rotor or the rotational shaft; and a passage separator provided between the drive and the compression device to separate a refrigerant passage from an oil passage, wherein the passage separator includes a first partition wall and a second partition wall, wherein the first partition wall is provided between an inner circumferential surface of the casing and the discharge hole of the compression device, and the second partition wall is provided between the discharge hole and balance weight, wherein the compression device further includes at least one oil recovery passage that communicates with the oil passage and is provided at one side of the compression device, wherein the first partition wall and second partition wall are connected by a third partition wall, and wherein at least a portion of the oil recovery passage is covered by the third partition wall.]

[6. The compressor of claim 5, wherein the first partition wall, the second partition wall, and the third partition wall are formed as an integral body.]

[7. The compressor of claim 6, wherein the integral body is fixed to the compression device.]

[8. The compressor of claim 5, wherein the oil recovery passage is covered by a member separate from the passage separator.]

[9. The compressor of claim 5, wherein the oil recovery passage includes a hole that passes through the compression device.]

[10. A compressor, comprising:

a casing having an internal space;

a drive comprising a stator fixed in the internal space and a rotor rotatably provided within the stator;

a compression device provided at a lower side of the drive, having a plurality of compression chambers and a discharge hole so as to discharge compressed refrigerant from the plurality of compression chambers into the internal space of the casing;

a rotational shaft configured to transfer a drive force from the drive to the compression device, the rotating shaft having an eccentric portion to be coupled through a central portion of the compression device to overlap the compression chamber in a radial direction;

a balance weight provided on the rotor or the rotational shaft; and a passage separator provided between the drive and the compression device to separate a refrigerant passage from an oil passage, wherein the passage separator includes a first partition wall and a second partition wall, wherein the first partition wall is provided between an inner circumferential surface of the casing and the discharge hole of the compression device, and the second partition wall is provided between the discharge hole and balance weight, wherein the compression device further includes at least one oil recovery passage that communicates with the oil passage and is provided at one side of the compression device, wherein the first partition wall and second partition wall are connected by a third partition wall, and wherein at least a portion of the oil recovery passage is covered by the third partition wall.]

[11. The compressor of claim 10, wherein the first partition wall, the second partition wall, and the third partition wall are formed as an integral body.]

[12. The compressor of claim 11, wherein the integral body is fixed to the compression device.]

[13. The compressor of claim 10, wherein the oil recovery passage is covered by a member separate from the passage separator.]

[14. The compressor of claim 10, wherein the oil recovery passage includes a hole that passes through the compression device.]

*15. A compressor, comprising:*

*a casing including a discharge pipe through which a refrigerant is discharged and having a storage space in which oil is stored;*

*a drive coupled to an inner circumferential surface of the casing to rotate a rotational shaft;*

*a compression unit disposed in a direction away from the discharge pipe from the drive and coupled to the rotational shaft and lubricated with the oil to compress the refrigerant, and including a discharge hole to discharge the refrigerant or a mixture of refrigerant and the oil;*

*one or more space provided at at least a portion of an outer peripheral surface of the drive to recover the oil into the oil storage space;*

*one or more groove recessed in an outer surface of the compression unit to communicate with the one or more space;*

*a frame discharge hole provided on the compression unit and spaced apart from the discharge hole to discharge the refrigerant or the mixture of refrigerant and the oil toward the drive unit; and a1 first partition wall coupled to one of the compression unit or the drive and disposed between the discharge hole and the one or more groove, wherein the first partition wall is disposed between the frame discharge hole and the one or more groove.*

*16. The compressor according to claim 15, wherein the discharge hole penetrates through the compression unit in parallel with the rotational shaft.*

*17. The compressor according to claim 15, wherein the discharge hole is provided closer to the rotational shaft than the one or more groove, and wherein the first partition wall is disposed between the discharge hole and the one or more groove.*

*18. The compressor according to claim 15, wherein the first partition wall is provided between the compression unit and the drive to separate the oil or refrigerant discharged from the discharge hole from oil passing through the one or more space or the one or more groove.*

*19. The compressor according to claim 15, wherein at least one of ends of the first partition wall contacts the compression unit or the drive.*

*20. The compressor according to claim 15, wherein the first partition wall has a ring shape so that the rotational shaft and the discharge hole are disposed inside thereof.*

*21. The compressor according to claim 15, further comprising a balance weight coupled to the rotational shaft or the drive to damp vibration of the drive, and a second partition wall disposed between the balance weight and the discharge hole.*

*22. The compressor according to claim 21, wherein the second partition wall is configured to block exposure of an outer circumferential surface of the balance weight to the discharge hole.*

*23. The compressor according to claim 21, wherein the second partition wall is configured to shield a gap between the balance weight and the compression unit.*

*24. The compressor according to claim 21, wherein the second partition wall is longer than a distance between the balance weight and the compression unit.*

*25. The compressor according to claim 21, further comprising a third partition wall that connects the first partition wall and the second partition wall, wherein third partition wall is configured to be coupled to the drive or the compression unit.*

* * * * *